United States Patent [19]
Kohno et al.

[11] Patent Number: 5,688,028
[45] Date of Patent: Nov. 18, 1997

[54] BRAKE PRESSURE CONTROLLER

[75] Inventors: Teruhisa Kohno; Tarou Segawa, both of Itami, Japan

[73] Assignee: Sumitomo Electric Industries, Ltd., Osaka, Japan

[21] Appl. No.: 607,765

[22] Filed: Feb. 27, 1996

[30] Foreign Application Priority Data

Feb. 27, 1995 [JP] Japan ................... 7-038561
Nov. 21, 1995 [JP] Japan ................... 7-302857

[51] Int. Cl.⁶ .................. B60T 13/18; B60T 8/32
[52] U.S. Cl. .................. 303/116.4; 303/113.1; 303/119.2
[58] Field of Search .............. 303/119.2, 116.4, 303/119.1, 113.1; 137/884; 439/34, 76.1

[56] References Cited

U.S. PATENT DOCUMENTS

| | | | |
|---|---|---|---|
| 4,953,918 | 9/1990 | Hashida et al. | 303/116.4 |
| 5,137,455 | 8/1992 | Moerbe et al. | |
| 5,281,013 | 1/1994 | Pichon et al. | 303/116.4 |
| 5,326,235 | 7/1994 | Bruhn. | |
| 5,362,137 | 11/1994 | Kohno | 303/119.2 |

FOREIGN PATENT DOCUMENTS

| | | |
|---|---|---|
| 0584682 | 3/1994 | European Pat. Off. |
| 904205 | 2/1954 | Germany. |
| 9415078 | 3/1995 | Germany. |
| 53-23914 | 7/1978 | Japan. |
| 3-101080 | 4/1991 | Japan. |
| 6-293255 | 10/1994 | Japan. |
| 6-85978 | 12/1994 | Japan. |
| 1486019 | 9/1977 | United Kingdom. |
| 9521758 | 8/1995 | WIPO. |

*Primary Examiner*—Douglas C. Butler
*Attorney, Agent, or Firm*—Wenderoth, Lind & Ponack

[57] ABSTRACT

A small, lightweight, easy-to-assemble brake pressure controller manufactured by integrating a hydraulic circuit block including pumps and pressure regulating solenoid valves, pump-driving motor, and a control block having a built-in electronic control circuit for producing signals for actuating the motor and the solenoid valves. The rotor of the motor is housed in a bore formed in the hydraulic circuit block in which are mounted the plunger pumps and solenoid valves. A rear opening of the motor is closed by the control block. Lead pins extending from a brush holder of the motor and solenoid coils of the solenoid valves extend through a case of the control block, and are electrically connected to an electronic control circuit on a printed circuit board. With this arrangement, it is possible to electrically connect the hydraulic circuit block to the control block without using external lead wires and connectors. The feeding brush and the solenoid coils can be assembled easily by mounting them integrally on the control block beforehand.

5 Claims, 8 Drawing Sheets

BRAKE PRESSURE CONTROLLER

BACKGROUND OF THE INVENTION

The present invention relates to a brake pressure controller mounted in a brake line extending from a master cylinder to vehicle wheel brakes for performing antilock and/or traction control by controlling the wheel brake pressures.

Typical conventional brake pressure controllers include a pressure regulating unit having a hydraulic circuit block in which are mounted pumps, solenoid valves for regulating wheel brake pressures (fluid pressures in the wheel cylinders) by opening and closing the fluid passage in each valve, and a pump-driving motor. They further comprise a control block having an electronic control circuit mounted in a case and including a microcomputer for producing signals for actuating the motor and solenoid valves if judgment is made that any of the vehicle wheels are locking. The pressure regulating unit and the control block are separate members, which are usually mounted at different locations on a vehicle.

Thus, it is necessary to connect these members by means of a harness. To mount these two separate members, a large installation space and a large number of mounting brackets for securing the components to the vehicle are needed. Unexamined Japanese Patent Publication 3-101080 and Unexamined Japanese Utility Model Publication 6-85978 propose to integrate the pressure regulating unit and the control block to reduce the size of the entire device, the number of parts and the assembling cost.

The brake pressure controller disclosed in the above publications has its control block mounted on a surface of the hydraulic circuit block that is different from the surface on which the motor is mounted. In this arrangement, although the solenoid valves can be easily connected to the electronic control circuit in the control block by means of lead pins or a flexible printed circuit board, the motor, which is provided apart from the control block, has to be connected to the electronic control circuit by means of lead wires and connectors. If they are connected together with lead pins, it is necessary to provide some special means for absorbing any displacement of connecting points.

An object of the present invention is to provide a brake pressure controller which is small in size, lightweight and simple in structure and can be assembled at low cost by integrating the pressure regulating unit and the control block without using lead wires.

SUMMARY OF THE INVENTION

According to the present invention, a brake pressure controller provided in a brake line extending from a master cylinder to wheel brakes, the controller includes a hydraulic circuit block comprising pumps and pressure regulating solenoid valves for controlling the pressure for the each wheel brake by opening and closing a fluid passage in each solenoid valve, an electric motor for driving the pumps; and a control block having a built-in electronic control circuit for outputting signals for driving the solenoid valves and the motor, the hydraulic circuit block, the motor and the control block being joined together as a one-piece unit, characterized in that an opening formed in the rear of the motor is closed by the control block.

The motor may be a direct-current motor. The commutator may be mounted on a rear portion of the rotor shaft. The rotor may be mounted in the hydraulic circuit block, with the control block directly connected to the hydraulic circuit block. The feeding brush including its brush holder and/or the solenoid coils for the solenoid valves may be mounted on the control block by integrally molding them. The solenoid valves may be provided around the outer periphery of the motor, parallel to the rotor shaft, with the solenoid coils for the solenoid valves provided on the side where the feeding brush is provided.

The motor rotor may be supported at two points by two bearings provided nearer to the front end of the motor than a core carrying a winding. Alternatively, the motor rotor may be supported by bearings provided on both sides of a core carrying a winding, with the rotor shaft having a portion extending rearwardly of the motor from the rear bearing, the commutator being mounted on the rearwardly extending portion of the rotor shaft.

A stopper means may be provided to temporarily keep the feeding brush out of contact with the commutator. The commutator may have a rear end face as an electrode surface that extends radially from the axis of the rotor shaft, with the feeding brush provided opposite to and parallel to the rotor shaft and kept in contact with the electrode surface. Casings for the motor and the solenoid valves may be part of the hydraulic circuit block, the casings being an integral member made of a magnetizable material and forming part of the magnetic paths of the motor and the solenoid valves. The portion of the hydraulic circuit block other than the casings for the motor and the solenoid valves may be made of a lightweight unmagnetizable material.

The connecting conductors extending from the brush holder, lead pins or terminals that can be inserted directly into the sockets are preferable to flexible conductors formed e.g. by printing.

Since the rear opening of the motor is closed by the control block, the distance between the feeding brush and the control circuit in the control block is very short, so that they can be electrically connected together very easily. Since the control block serves as the rear wall of the motor, there is no need to provide a separate rear wall for the motor. The entire device is thus small in size, lightweight and simple in structure.

The following are functions and effects of the present invention.

The power supply brush is electrically connected to the circuit in the control block through conductors extending from the brush holder. By using plug-in type lead pins as the conductors, the brush and the circuit in the control block can be electrically connected together easily.

The commutator is mounted on a rear portion of the rotor shaft. With this arrangement, the power supply brush can be mounted easily. Also, it is possible to mount the brush on the control block beforehand. Thus, the controller can be assembled more easily.

The control block is directly connected to the hydraulic circuit block with the rotor mounted in the hydraulic circuit block. The entire device is thus more compact and lightweight. The solenoid valves can be electrically connected more easily.

Since the feeding brush is mounted on the control block, no special support means is necessary. The brush can be mounted easily.

Since the feeding brush and the brush holder are mounted on the control block by forming at least part of the brush holder by molding as an integral part of the control block, the feeding brush can be mounted on the control block, not after, but when forming the brush holder.

The solenoid coils can be mounted integrally on the control block and inserted in solenoid receiving recesses formed in the hydraulic circuit block. Thus, it is possible to simultaneously mount the control block and the solenoid coils, so that the entire controller can be assembled more easily. No special supporting means for the solenoid coils is necessary.

Bobbins for the solenoid coils are formed by molding as integral parts of the control block. Thus, the solenoid coils can be mounted on the control block, not after, but when forming the bobbins.

The solenoid valves are provided around the outer periphery of the motor, parallel to the rotor shaft. The solenoid coils for the solenoid valves are provided on the side where the power supply brush is provided. Thus, the connecting points between the pressure regulating unit and the electronic control circuit are positioned close to one another. Thus, they can be connected together very easily. The entire device is compact in size and lightweight.

The motor rotor is supported at two points by two bearings provided nearer to the front end of the rotor than is the core. This arrangement makes it unnecessary to form the control block from a high strength material. Namely, it is possible to form the control block from e.g. a resin. This leads to improved productivity, lower manufacturing cost and further reduction in weight of the entire device. Also, it is not necessary to provide a support member for the rear bearing, which is necessary when supporting the rotor on both sides of the core.

For the same reasons as stated above productivity is increased and the manufacturing cost is reduced. With this arrangement, a support member for the rear bearing is necessary. But it is possible to rotate the rotor of the former more stably than the rotor of the latter.

A stopper means is provided to keep the feeding brush out of contact with the commutator when mounting the control block. It is thus easy to mount the control block.

The feeding brush is provided parallel to the rotor shaft and kept in contact with the rear end face of the commutator as an electrode surface so that the brush will not interfere with the brush when mounting the control block. With this arrangement, it is possible to mount the control block easily even without the stopper. Also, it is possible to mount the holder for the feeding brush on the control block beforehand or to directly couple the brush holder to the circuit in the control block to supply power to the motor. Thus, the controller can be easily assembled. The controller thus assembled in simple in structure.

A hydraulic circuit block is used as a common casing for the motor and the solenoid valves and a part of their magnetic paths. Thus, the controller can be manufactured at low cost. Made up of small number of parts, such controller is simple in structure and lightweight.

Since a portion of the hydraulic circuit block is made of a lightweight unmagnetizable material, the entire device is also lightweight. Also, it is possible to prevent leakage of magnetic flux from the magnetic circuits of the motor and the solenoid valves.

Other features and objects of the present invention will become apparent from the following description made with reference to the accompanying drawings, in which:

DETAILED DESCRIPTION OF THE PREFERRED EMBODIMENT

Embodiments of the present invention are now described with reference to the accompanying drawings.

Figure 1:
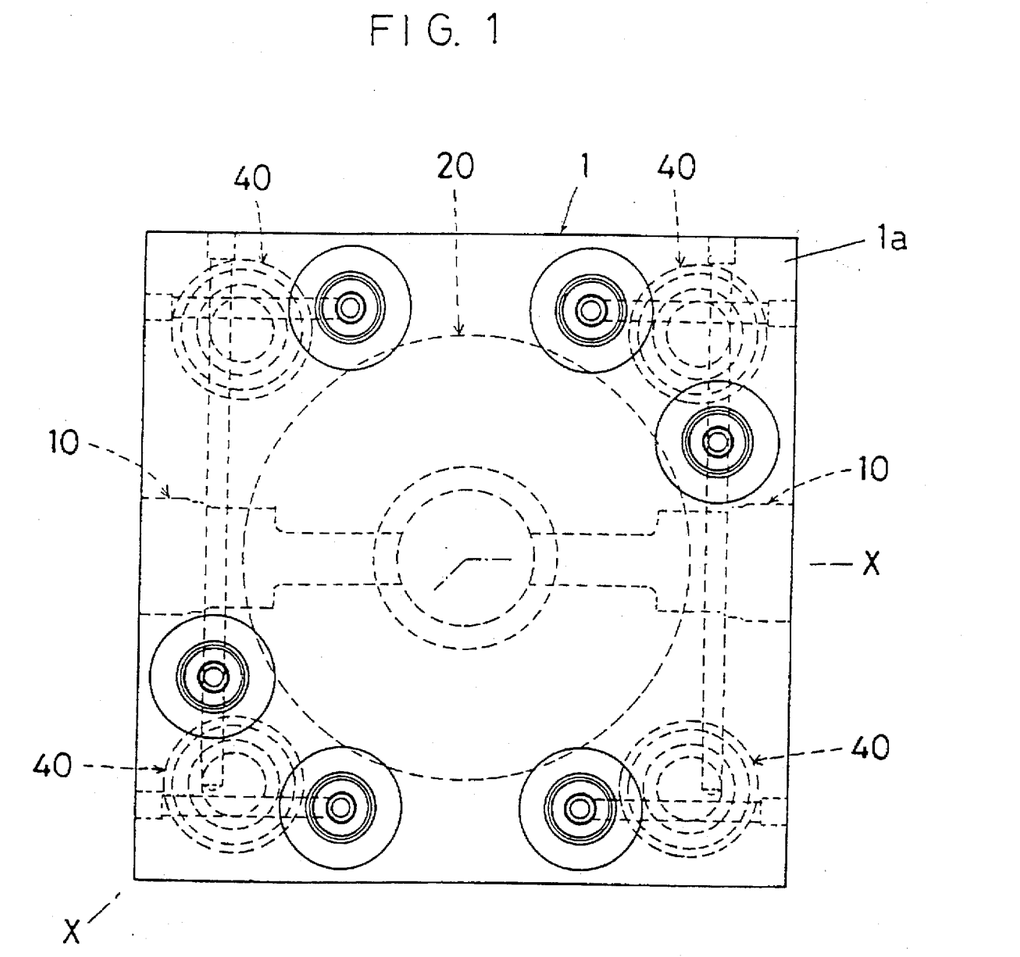
FIG. 1 is a plan view of a first embodiment.
Figure 2:
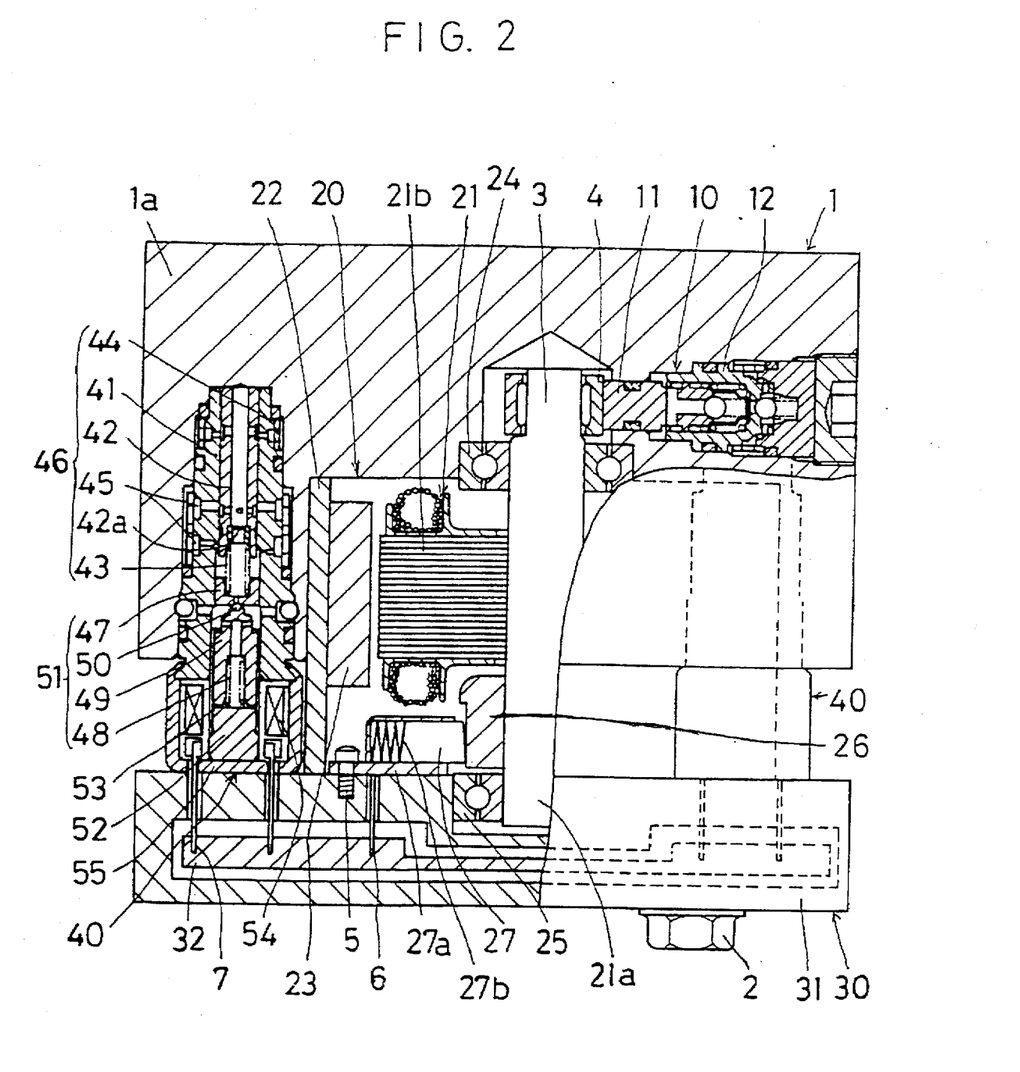
FIG. 2 is a view partially cut away along line X—X of FIG. 1.

FIGS. 1 and 2 show the first embodiment of the device according to the present invention. A brake pressure controller has a hydraulic circuit block 1 that houses plunger pumps 10, a direct-current motor 20 for driving the pumps 10, and solenoid valves 40. A control block 30 is fastened to the rear of the motor 20 by means of bolts 2 so as to close an opening formed in the rear of the motor 20.

The rotor 21 of the motor 20 has a shaft 21a having a cam (eccentric shaft portion) 3 at its output end. Each plunger pump 10 has a plunger 11 in abutment with an outer ring of a bearing 4 mounted around the cam 3. Thus, the plunger pumps 10 are driven by rotating the rotor 21. The plunger pumps 10 themselves are disclosed in Unexamined Japanese Patent Publication 6-85978 and do not constitute any important part of the present invention. Thus, more detailed description of the pumps 10 is omitted.

The motor 20 comprises a cylindrical yoke 22 of a magnetizable material mounted in a bore formed in the hydraulic circuit block 1, permanent magnets 23 fixed to the inner periphery of the yoke 22, and the rotor 21 which has a core 21b carrying a winding. The shaft 21a has its front end supported on a bearing 24 mounted on the hydraulic circuit block 1 and its rear end on a bearing 25 mounted on a case 31 of the control block 30. Between the bearing 25 and the core 21b, a commutator 26 is fixed to the shaft 21a. Electric power is supplied to the winding of the core 21b by pressing a feeding brush 27, biased by a spring 27b, against the commutator 26. The brush 27 is inserted in a case-shaped brush holder 27a fixed to the case 31 by setscrews 5 so as to be protrudable from the holder 27a.

The control block 30 includes a printed circuit board 32 carrying a microcomputer and other electronic components and housed in the case 31. The feeding brush 27 is electrically connected to the electronic control circuit through lead pins 7 extending rearwardly of the motor from the brush holder 27a into sockets formed in the circuit board 32.

Each solenoid valve 40 includes a flow control valve 46 comprising a sleeve 41 mounted in the hydraulic circuit block 1, a spool 42 slidably mounted in the sleeve 41 and having a fixed-size orifice 42a, and a spring 43 biasing the spool 42 in one direction. This flow control valve 46 can keep the flow rate constant irrespective of the pressure difference between inlet 44 and outlet 45 because the degree of opening of the flow passage is controlled by the movement of the spool 42. Such a flow control valve is disclosed in detail in Unexamined Japanese Patent Publication 6-293255.

The solenoid valve 40 further comprises a discharge valve 51 provided in the rear of the spool 42 of the control valve 46 and comprising a fixed valve seat 47, an armature 49 carrying at its front end a spherical valve body 50, and a spring 48 biasing the armature 49 toward the fixed valve seat 47. By moving the valve body 50 into and out of contact with the valve seat 47, the flow passage can be selectively opened and closed.

The rear end of the armature 49 is opposed to one end of a stator 52 with some gap kept between. The armature 49 is slidably guided in a guide sheath 53 made of an unmagnetizable material and having one end liquid-tightly press-fitted in the sleeve 41 and the other end on the stator 52. Around the stator 52, a solenoid coil 54 is mounted in a frame 55 of a magnetizable material which is fixed to the sleeve 41 by caulking.

The solenoid coil 54 is electrically connected to the electronic control circuit through lead pins 7 extending rearwardly of the motor from the coil 54 through the case 31 into sockets formed in the circuit board 32 in the case 31. By supplying power to the coil 54, a magnetic flux is formed around the coil 54 through the armature 49, stator 52, frame 55 and sleeve 41.

When antilock brake control starts, power is supplied to the solenoid coil 54 of each solenoid valve 40. The armature 49 is attracted toward the stator 52 against the force of the spring 48. The spherical valve body 50 will separate from the fixed valve seat 47. The discharge valve 51 opens, allowing the brake fluid in a wheel brake (not shown) connected to the outlet 45 to be discharged into the reservoir (not shown). The brake pressure thus decreases, preventing lockup of the corresponding vehicle wheel.

At the same time, electric power is supplied through the brush 27 to the motor 20. The rotor 21 thus rotates, activating the pumps 10 to draw up discharged brake fluid and return it to the brake circuit. While the brake pressure is decreasing during antilock control, the spool 42 is kept at the lowest level in the figure, substantially cutting off fluid communication between the inlet 44 and outlet 45. The brake fluid returned into the brake circuit by the pumps will thus never flow back into the wheel brake.

When the wheel speed begins to increase as a result of antilock brake pressure control (brake pressure reduction), power supply to the solenoid coil 54 is stopped. The armature 49 will return to its original position, biased by the spring 48. The discharge valve 51 thus closes. The spool 42 now moves to the point where the forces that act on both ends of the spool balance. The brake fluid returned by the pumps 10 flows through the inlet 44, fixed orifice 42a and outlet 45 into the wheel brake at a constant controlled rate. The brake pressure thus reincreases at a constant rate. This operation is repeated during antilock control to keep the wheel brake pressure within an optimum range.

In this embodiment, the housing 1a of the hydraulic circuit block 1 is made of an unmagnetizable material such as an aluminum alloy, whereas the frame 55 of each solenoid valve and the yoke 22 of the motor are made of a magnetizable material and exposed to the outer environment. The feeding brush 27 is, as mentioned earlier, electrically connected to electronic control circuit by screwing it to the case 31 of the control block 30 beforehand. The bearing 25 supported by the case 31 has its inner ring press-fitted in the rotor shaft 21a beforehand. To assemble the controller of this embodiment, the components of the motor 20 except the brush, the pumps 10 and the solenoid valves 40 are mounted in the hydraulic circuit block 1. Then, by coupling the control block 30 to the block 1 by bolts 2, the feeding brush 27 is pressed against the commutator 26, while the lead pins 7 are inserted in the corresponding sockets in the printed circuit boards 32. The controller is thus assembled.

The four solenoid valves 40, each corresponding to each of the four vehicle wheels, are provided around the motor 20 (FIG. 1), parallel to its rotor shaft 21a. The lead pins 7 extending from the solenoid coil 54 of each solenoid valve 40 are not so long, so that they can be arranged with proper positional and pitch accuracy. They extend in the same direction as the direction in which the outer ring of the bearing 25 is inserted into the case 31. Thus, simply by inserting the bearing 25 into the case, the pins 7 are automatically inserted into the corresponding sockets. The controller of this embodiment can be assembled with extreme ease and high efficiency, and at a low cost.

Figure 3:
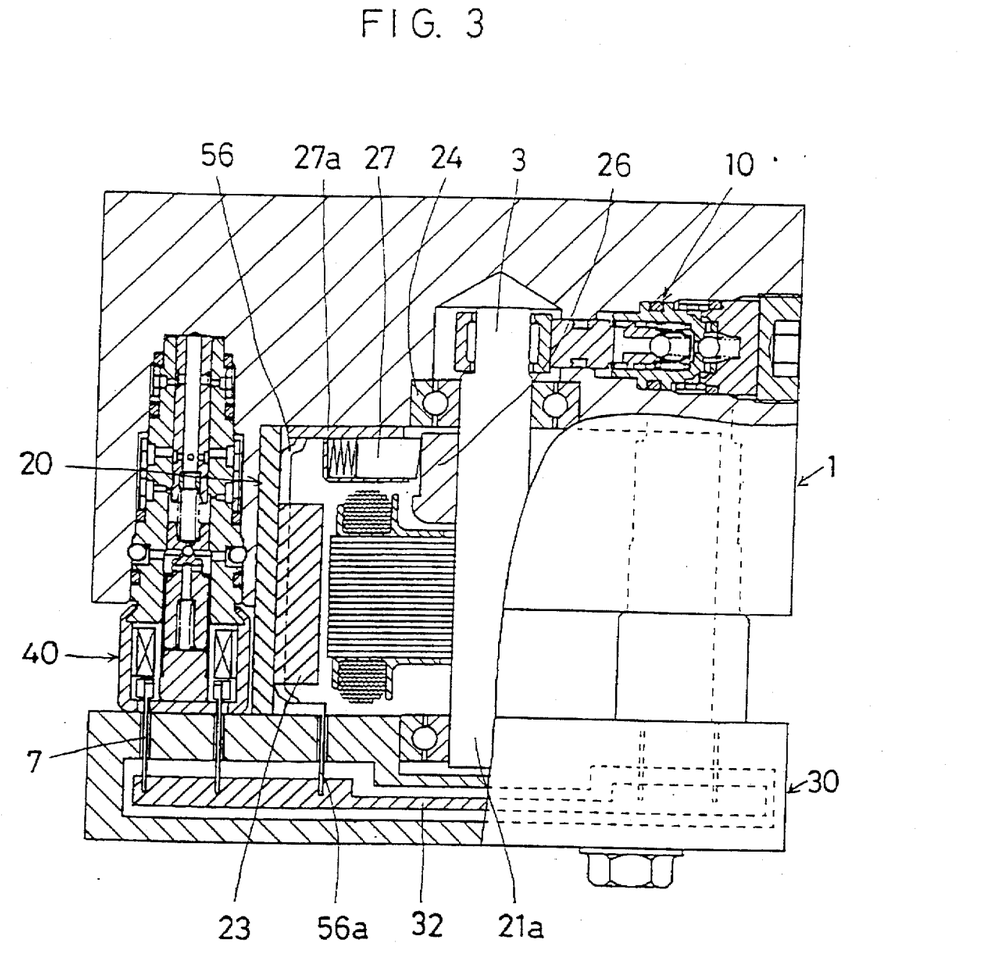
FIG. 3 is a partially cutaway front view of a second embodiment.

FIG. 3 shows the second embodiment, which is a slight modification of the first embodiment. In this embodiment, the commutator 26 of the motor 20 is mounted on the front part of the shaft of the rotor 21 as shown. The feeding brush 27 is electrically connected through conductors 56 extending between the adjacent permanent magnets 23 and terminals 56a to the printed circuit board 32. The object of the invention is achievable with this arrangement, too.

Figure 4A:
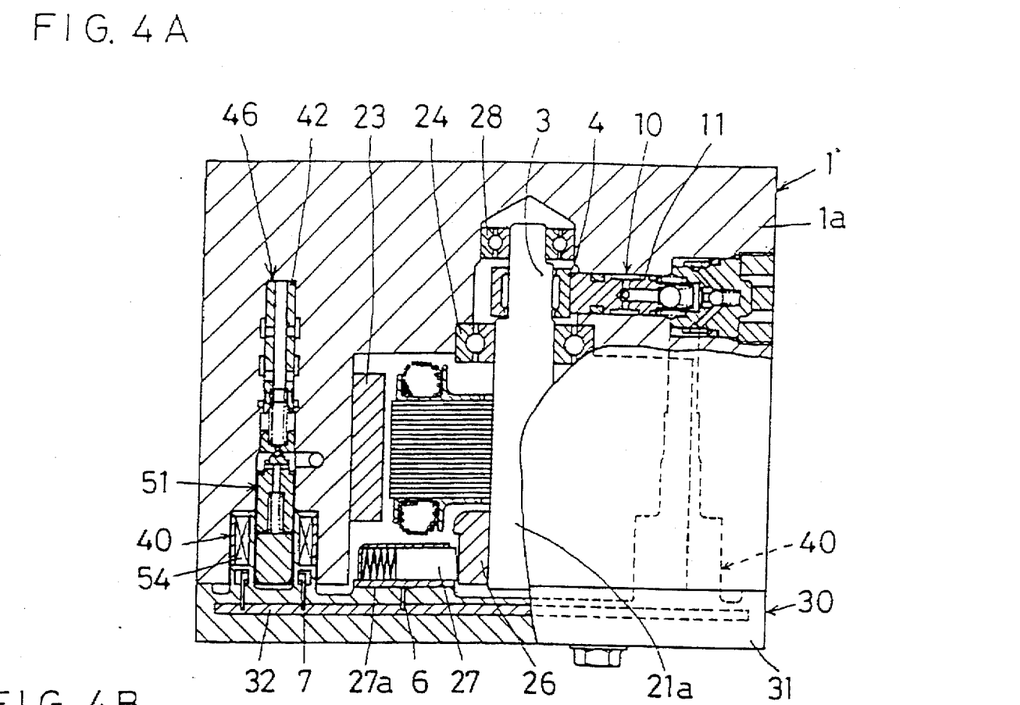
FIG. 4A is a partially cutaway front view of a third embodiment.
Figure 4B:
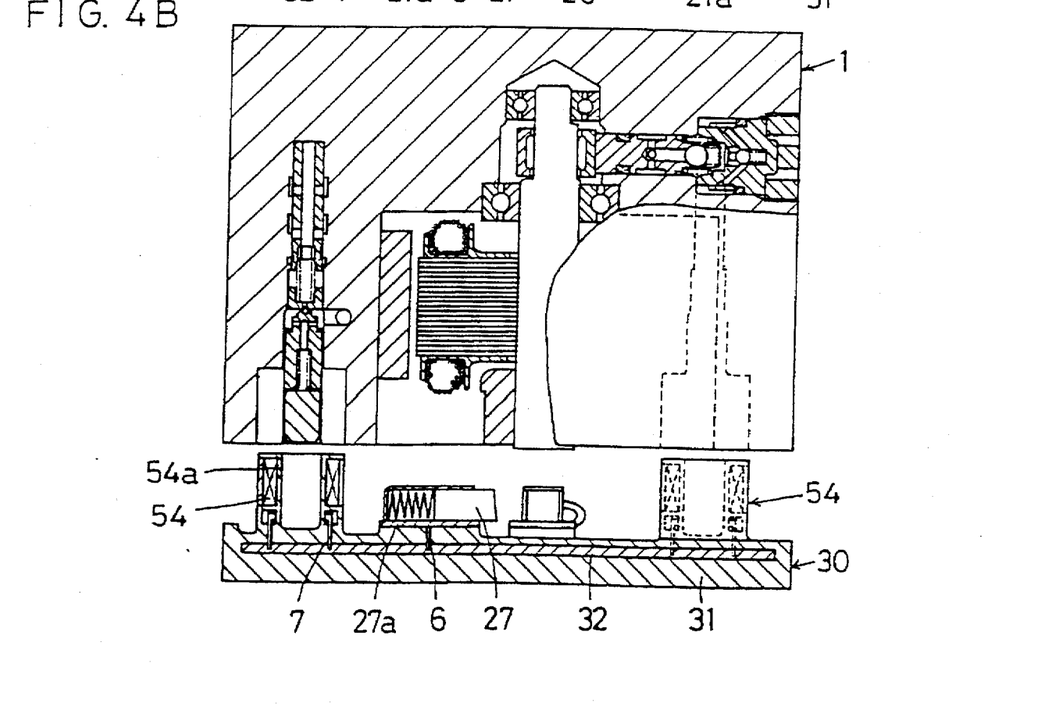
FIG. 4B is a view showing the device of FIG. 4A with the control block removed.

FIGS 4A–4B shows the third embodiment. This embodiment differs from the first embodiment in that the bearing 25 shown in FIG. 2 is replaced with a bearing 28 for supporting the output end of the shaft 21a. The rotor 21 is thus supported at two points on both sides of the bearing 4, i.e. in front of the core 21b. This makes it unnecessary to support any high load that acts on the shaft 21a with the control block 30. Thus, the case 31 can be formed from a lightweight resin, so that it is possible to reduce the weight and manufacturing cost of the entire controller, and improve its productivity.

Also, in this embodiment, the housing 1a of the hydraulic circuit block 1 is made of a magnetizable material. The permanent magnets 23 and the solenoid coils 54 are directly inserted in a bore and coil housing recesses formed in the housing 1a, respectively. Namely, the housing itself is used as a common sheath for the motor and the solenoid valves. The number of components of the entire controller is thus small.

Further, the controller of this embodiment has no sleeve (41 in FIG. 2) in the flow control valve 46 and no pump cases (12 in FIG. 2) for the plunger pumps 10. The spools 42 and the plungers 11 slide in bores formed in the housing 1a. The number of components of the entire controller is thus made even smaller.

As shown in FIG. 4B, bobbins 54a for the solenoid coil 54 are integral parts of the case 31 formed by molding, so that the solenoid coils 54 are formed as integral parts of the control block 30. The feeding brush 27 and the brush holder 27a are also formed by molding as integral parts of the control block 30. Thus, it is not necessary to screw the brush holder to the control block 30, mount the solenoid coils 54 on the control block 30 through frames (55 in FIG. 2), and no electrical connections are necessary when mounting the control block 30. Such a controller can be assembled more easily and is simple in structure and small in size.

Figure 5A:
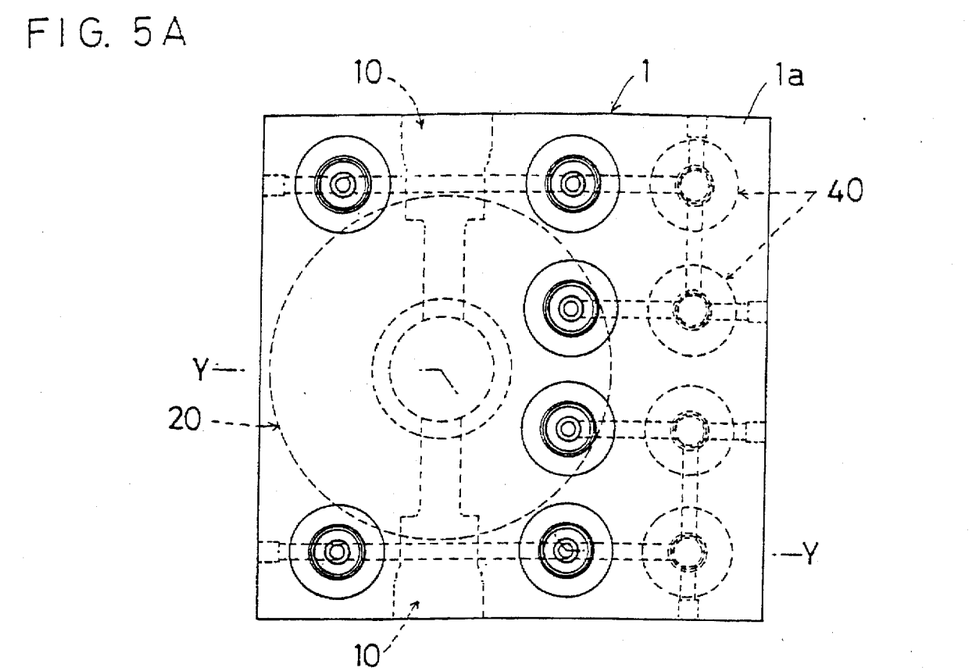
FIG. 5A is a plan view of a fourth embodiment.
Figure 5B:
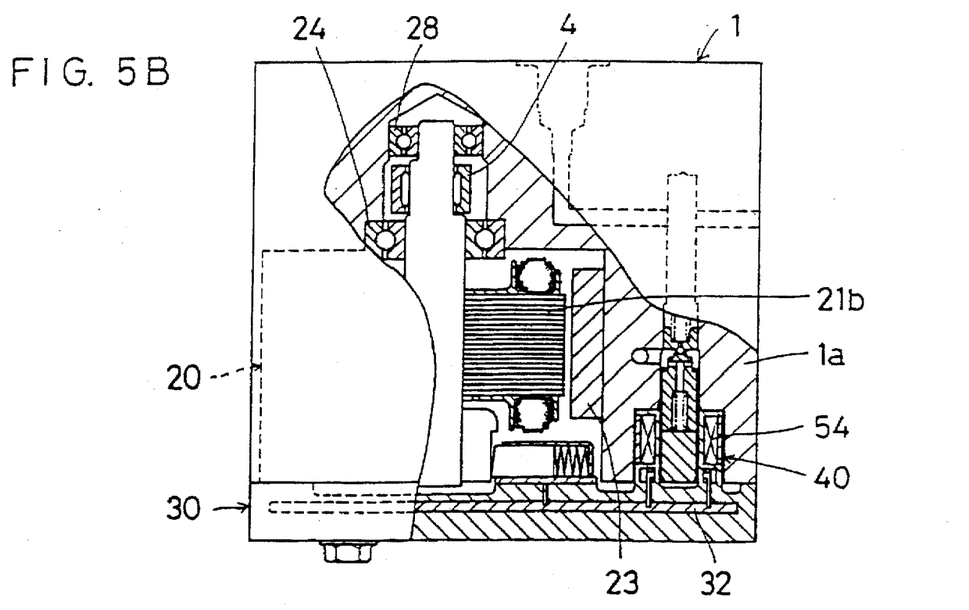
FIG. 5B is a view partially cut away along line Y—Y of FIG. 5A.

FIG. 5 shows the fourth embodiment, which differs from the third embodiment only in that the solenoid valves 40 are collected at one end of the motor. Since the solenoid valves are provided only at one end of the motor, electrical connections can be made easily. Also, it is possible to neatly arrange the circuit on the printed circuit board 32 and thus to reduce the size of the board 32.

Figure 6A:
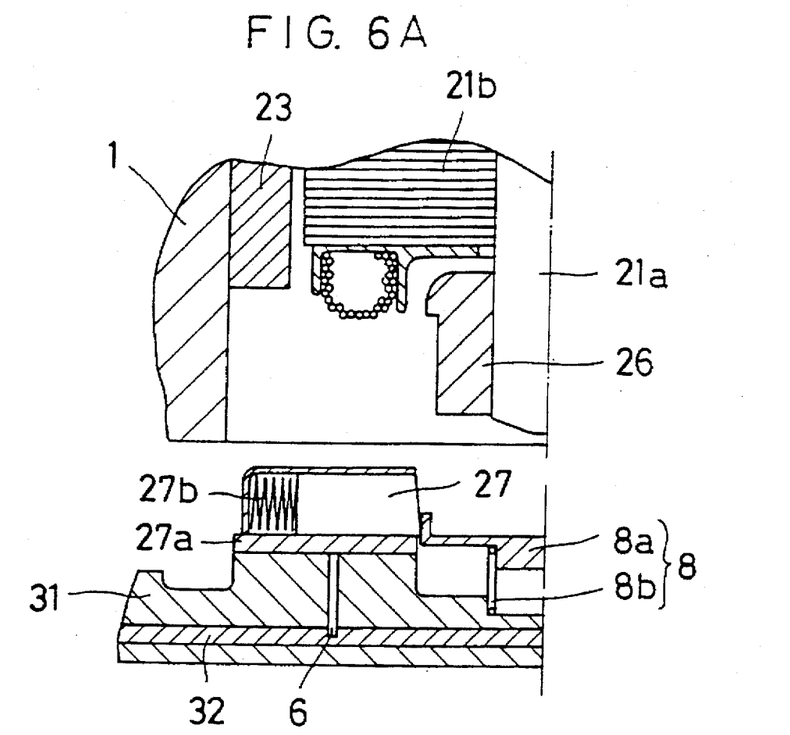
FIG. 6A is a sectional view showing a portion of a fifth embodiment with the control block removed.
Figure 6B:
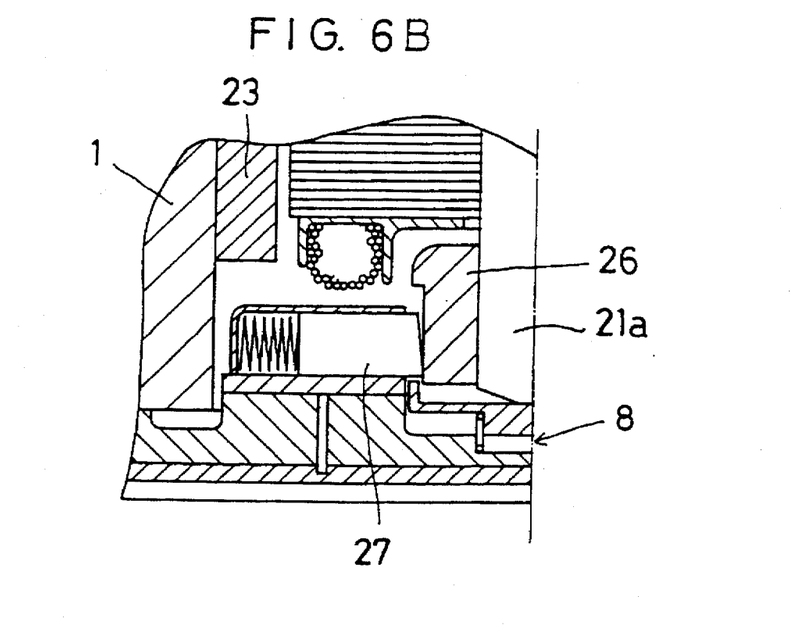
FIG. 6B is a sectional view showing the device of FIG. 6A with the control block mounted.

FIG. 6 shows the fifth embodiment. It has a stopper means 8 for preventing the feeding brush 27 from protruding from its holder.

As mentioned above, in the arrangement in which the feeding brush 27 is mounted on the control block 30, when mounting the control block, it is necessary to push back the feeding brush 27, which protrudes to its limit, biased by a spring 27b, to a point where it does not interfere with the end face of the commutator 26. Thus, it is difficult to automatically mount the control block.

In the fifth embodiment, the stopper means 8, which comprises a dish-shaped stopper 8a and a spring 8b biasing the stopper 8a away from the feeding brush 27. Before mounting the control block 30, the brush 27 is pushed back to a point (FIG. 6A) where it does not abut the commutator 26. In this state, the stopper 8a engages the brush 27 as shown in FIG. 6A. When the control block 30 is mounted, the stopper 8a is pushed by the motor shaft 21a and disengages from the brush 27, which is thus pushed out by the spring 27b and pressed against the outer periphery of the commutator 26.

In the arrangement shown, the shaft 21 is in point contact at its center with the stopper 8a. Since the speed of the shaft is near zero at its central portion while the motor is being driven, there will be no practical problem with the illustrated arrangement. But if it is not desirable to bring the rotor shaft into contact with the stopper 8a, the stopper may be provided to surround the brush holder 27a. In this case, it is necessary to provide the hydraulic circuit block 1 with a means for disengaging the stopper from the brush.

Figure 7:
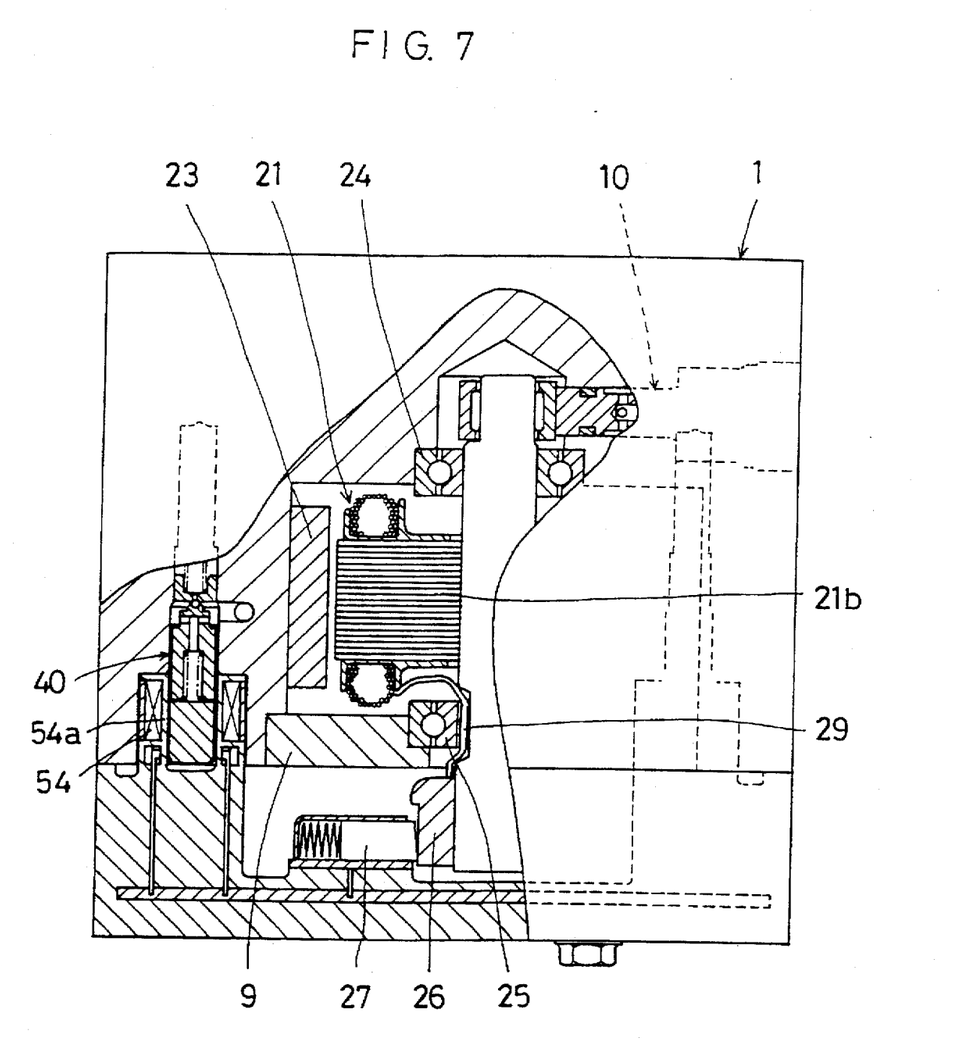
FIG. 7 is a partially cutaway view of a sixth embodiment.

FIG. 7 shows the sixth embodiment. In this embodiment, the same effect as in the fourth embodiment is achievable with the structure in which the rotor 21 is supported on both sides of the core 21b. More specifically, the bearing 25 provided in the rear of the motor is supported on a support member 9 mounted on the hydraulic circuit block 1. The shaft 21a of the rotor extends rearwardly of the motor from the bearing 25. The commutator 26 is mounted on this rear extension of the shaft 21a. With this arrangement, it is not necessary to support the shaft 21a with the control block 30, so that it is possible to form the control block 30 from a resin. The commutator 26 is electrically connected to the wiring of the core through a magnet wire 29 that extends through a groove formed in the shaft 21a while clearing the inner ring of the bearing 25.

Figure 8A:
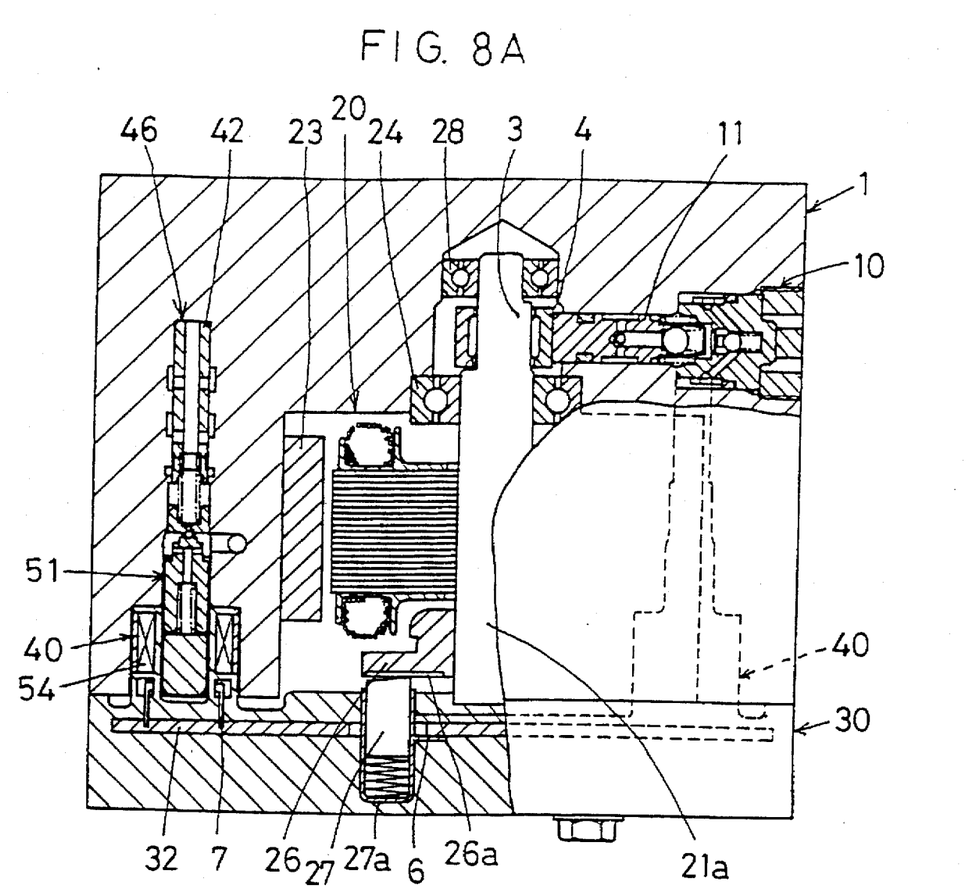
FIG. 8A is a partially cutaway front view of a seventh embodiment.
Figure 8B:
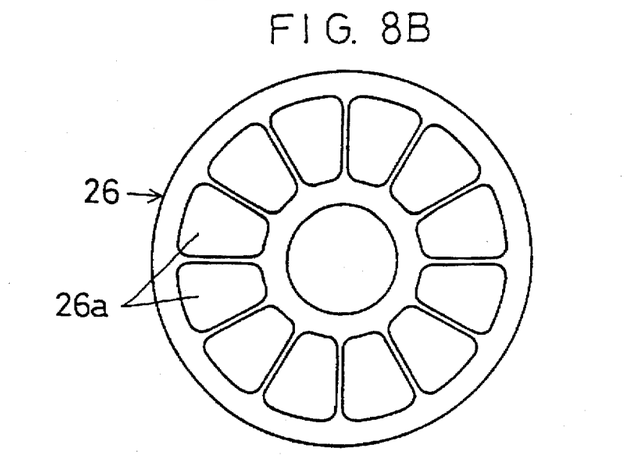
FIG. 8B is a view of an end face of the commutator as an electrode surface.

FIGS. 8A-B show the seventh embodiment. In this embodiment, the commutator 26 has a radial rear end face as a power-receiving electrode surface 26a. The feeding brush 27 is provided parallel to the rotor shaft 21a, opposite to its outer periphery, to come into contact with the electrode surface 26a. With this arrangement, it is possible to mount the control block 30 without the need to push the feeding brush 27 into the brush holder 27a against the force of the spring. In the arrangement shown, a conductor 6 extending from the brush holder 27a is connected to the surface circuit on the printed circuit board 32. But the brush holder 27a may be provided to extend through the board to solder it directly to the circuit on the board. Otherwise, this embodiment is structurally the same as the third embodiment of FIG. 4.

In the third and subsequent embodiments, the entire housing 1a of the hydraulic circuit block 1 is made of a magnetizable material. But its portion other than the portion where the motor 20 and the solenoid coils 54 are encased may be made of a more lightweight unmagnetizable material because this portion is not used as part of the magnetic circuit. For example, this portion may be made of an aluminum material to reduce the weight of the entire device.

The solenoid valves 40 used in the embodiments are of the type comprising a flow control valve 46 and a discharge valve 51. But the concept of the present invention is applicable to the device of a type that utilizes two solenoid valves for each vehicle wheel as disclosed in Examined Japanese Patent Publication 53-23914.

What is claimed is:

1. A brake pressure controller comprising:

a hydraulic circuit block defining an open side;

a plurality of pumps mounted in said hydraulic circuit block;

a plurality of pressure regulating solenoid valves, mounted in said hydraulic circuit block, wherein each of said solenoid valve for controlling wheel brake pressure by opening and closing a fluid passage through said each solenoid valve;

a direct current electric motor, received in said open side of said hydraulic circuit block, for driving said plurality of pumps, said direct current electric motor including a rotor shaft having a first end supported in said hydraulic circuit block and an unsupported second end, a rotor mounted on said rotor shaft and having a core carrying a winding, and a commutator mounted on said rotary shaft adjacent said second end of said rotary shaft;

first and second bearings provided on a portion of said rotor shaft adjacent said first end of said rotor shaft, said first and second bearings supporting said rotor on said hydraulic circuit block at two spaced points which are located further away from said second end of said rotor shaft than said core, wherein said plurality of pumps engage said rotary shaft between said first and second bearings;

a control block directly connected to said hydraulic circuit block so as to close said open side of said hydraulic circuit block, said control block including a built-in electronic control circuit for outputting drive signals to said solenoid valves and said motor;

a brush holder secured to said control block; and a feeding brush inserted in said brush holder, said feeding brush contacting said commutator and being electrically connected to said electronic control circuit by a conductor extending from said brush holder, wherein said hydraulic circuit block, said electric motor and said control block are joined together as a one-piece unit.

2. The brake pressure controller as claimed in claim 1, further comprising a third bearing connected to said rotor shaft and drivingly engaging said plurality of pumps, wherein said third bearing is positioned between said first and second bearings.

3. The brake pressure controller as claimed in claim 1, wherein said control block includes a casing formed of a resin material.

4. The brake pressure controller as claimed in claim 1, wherein said hydraulic circuit block is formed of a magnetizable material.

5. The brake pressure controller as claimed in claim 1, wherein each of said plurality of pressure regulating solenoid valves has a solenoid coil which is connected to said electronic control circuit by conductors, and said solenoid coils are integrally connected to said control block.

* * * * *